Aug. 8, 1950 W. W. MOE 2,517,586
SIGNAL COMPRESSION CIRCUIT
Filed July 23, 1947
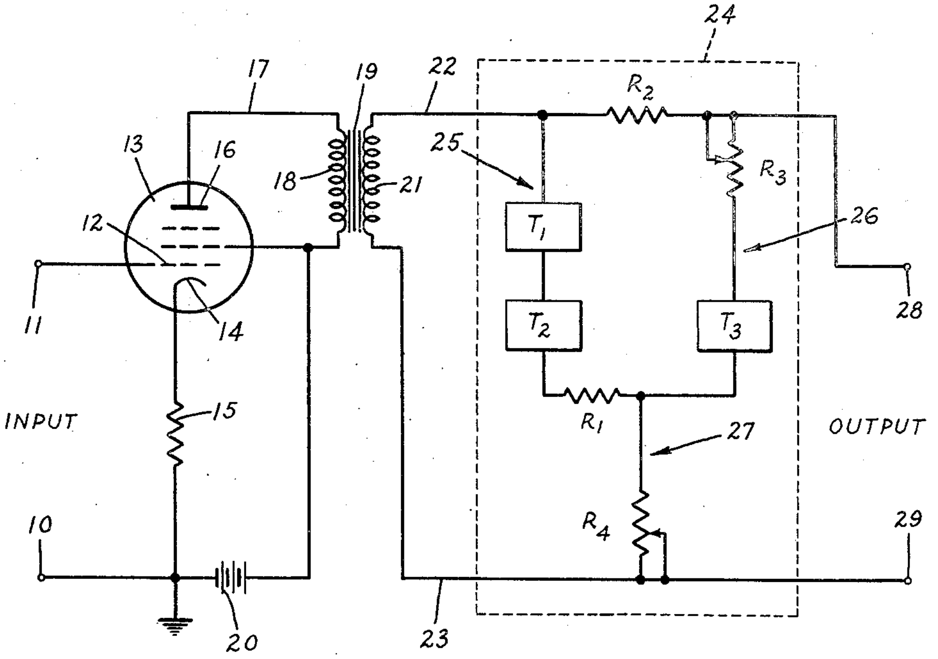
INVENTOR.
WILLIAM WEST MOE
BY
Campbell, Brumbaugh & Free
HIS ATTORNEYS.

UNITED STATES PATENT OFFICE 2,517,586

SIGNAL COMPRESSION CIRCUIT

William West Moe, Stratford, Conn., assignor to Time, Inc., New York, N. Y., a corporation of New York Application July 23, 1947, Serial No. 763,051

4 Claims. (Cl. 178—44)

The present invention relates to non-linear signal transmission circuits. More particularly, it relates to a new and improved signal compression circuit which is adapted to receive signal inputs that vary over a relatively wide range and to provide an output proportional to a fixed exponent of the signal input.

In electronic color correction apparatus, for example, it is desirable to utilize signal compression circuits for reducing a wide range of signal inputs to a lesser range. In particular, signal inputs representative of color densities of usable kodachromes, which may vary from about 50 to 1 up to about 500 to 1, may have to be reduced to an approximate range of, say, 50 to 1 before they can be utilized in electronic color correction apparatus. Signal compression circuits used for this purpose, heretofore, have not been satisfactory because they were unable to provide varying degrees of compression to a constant exponent over wide ranges. Further, it was not possible to change the degree of compression without producing a marked variation in compression over the operating range.

The principal object of the invention, accordingly, is to provide a new and improved signal compression circuit that is free from the above noted deficiencies of prior art systems and which provides compression to a fixed exponent over a wide range of input values.

Another object of the invention is to provide a new and improved signal compression circuit of the above character which is stable and will operate satisfactorily at relatively high frequencies.

A further object of the invention is to provide a new and improved signal compression circuit of the above character in which the degree of compression may be adjusted without producing any substantial deviation from the fixed exponent over the operating range.

The objects of the invention are attained by providing a signal compression circuit comprising a shunt network including a plurality of linear and non-linear circuit components. Preferably, the shunt network comprises a parallel circuit having both linear and non-linear resistances in each arm thereof, connected in series with a variable linear resistance. By proper choice of values for the network components, varying degrees of compression to a constant exponent over wide ranges may be obtained. Further, by adjusting the variable resistance, the degree of compression can be changed without producing any material change in the exponential relationship over the operating range.

Additional objects of the invention will be apparent from the following detailed description of a representative embodiment taken in conjunction with the single drawing. In the drawing, an input signal is applied to the terminals 10 and 11 of a signal compression circuit constructed according to the present invention. If the compression circuit is being utilized in electronic correction apparatus, for example, the input signal may vary over a range from about 50 to 1 up to about 500 to 1, corresponding to the color density ranges of usable kodachrome pictures.

Preferably, the input voltage is fed to a high impedance pentode amplifier circuit so that the compressor circuit will be supplied with current proportional to the input voltage. Thus, the input terminal 11 may be connected to the control grid 12 of a conventional high impedance pentode 13 and the terminal 10 may be connected to ground, the cathode 14 being grounded through a conventional cathode resistor 15. The plate electrode 16 of the pentode 13 is connected by a conductor 17 to one terminal of the primary winding 18 of an output transformer 19. The other terminal of the primary winding 18 is connected to the positive terminal of a source of plate voltage 20, the negative terminal of which is connected to the ground as shown. The other electrodes of the tube 13 are connected in the conventional manner for a pentode amplifier and need not be described in detail.

The secondary winding 21 of the transformer 19 is connected to a pair of conductors 22 and 23 across which is connected a signal compression network 24 constructed according to the present invention.

The signal compression network 24 comprises a pair of parallel arms 25 and 26 which are connected at one end to the conductor 22 and at the other end to a third arm 27, the lower end of which is connected to the conductor 23. The arm 25 comprises a pair of thyrite resistors $T_1$ and $T_2$ and a linear resistor $R_1$ in series and the arm 26 includes a linear fixed resistor $R_2$, a linear variable resistor $R_3$ and a thyrite resistor $T_3$ in series. The third arm 27 includes a variable linear resistor $R_4$. As is well known in the art, thyrite resistors are characterized by a high resistance at low applied voltages and a decreasing resistance as the voltage is increased.

In a typical circuit designed for a compression exponent of .60 for a range of inputs of 500 to 1 at a signal frequency of about 7680 cycles, the following values were used for the several electrical components in the compression network 24:

$T_1$, $T_2$, $T_3$—GE thyrite resistors, dwg. No. 839,689 gr. 1
$R_1$—6,800 ohms
$R_2$—3,900 ohms
$R_3$—4,100 ohms
$R_4$—0 ohms With the variable resistors $R_3$ and $R_4$ set for a fixed degree of compression, the output at the terminals 28 and 29 of the circuit described above was found to be proportional to the .60 power of the input voltage applied to the terminals 10 and 11. Further, it was found that if the exponent of compression was changed by adjusting the variable resistors $R_3$ and $R_4$, the new exponent of compression was constant over the required range of input voltages.

In operation, if a low input voltage is applied to the circuit described above, the impedance of the thyrite resistors $T_1$ and $T_2$ will be very high since only half of the voltage appearing across the conductors 22 and 23 is across each. The impedance of the thyrite resistor $T_3$ will be high as compared with the resistance of the linear resistors $R_3$ and $R_4$ so that the compression of the circuit at low voltages will be nearly equal to the compression of a single thyrite resistor.

As the voltage across the conductors 22 and 23 increases, the resistance of the thyrite resistor $T_3$ decreases and becomes comparable to the resistance of the resistor $R_3$ so that the latter tends to prevent the degree of compression from rising. At still higher voltages, the resistance of the thyrite resistor $T_3$ becomes small as compared with the resistance of the resistor $R_3$ so that the amount of compression decreases. However, at these higher voltages, the parallel circuit comprising the thyrite resistors $T_1$, $T_2$ and the linear resistor $R_1$ begins to add compression. Accordingly, by proper adjustment of the linear resistors $R_1$, $R_2$ and $R_3$, substantially constant compression to the desired exponent can be obtained over a selected input range of 500 to 1 or less.

It will be understood that by increasing the resistance of the variable resistor $R_4$, the amount of compression is decreased over the entire range. Accordingly, by varying the resistor $R_4$ and adjusting the resistor $R_3$, the degree of compression can be varied from a maximum value substantially down to zero without changing the exponent of compression for any desired degree of compression.

From the foregoing, it will be apparent that the invention provides a highly effective signal compression circuit for compressing a wide range of signal values to a lesser range. The system is stable and operates satisfactorily at relatively high frequencies. Further, the exponent of compression is constant over any required range and the degree of compression may be adjusted to accommodate any desired range of input signals.

It will be understood that the specific circuit described above may be varied in several respects within the scope of the invention. In particular, the values for the several circuit components may be changed as required to provide any desired degree of compression at any suitable fixed exponent of compression. Also, additional parallel circuits including combinations of linear and non-linear resistances may be employed to extend the range still farther, as desired. The invention is not intended to be restricted to the specific embodiments shown, therefore, but is susceptible of numerous changes in form and detail within the scope of the appended claims.

I claim:

1. In a non-linear signal transmission system, the combination of a signal channel, and a signal compression network interposed in said channel, said network comprising a shunt branch including at least two arms connected in parallel in series with a third arm, linear and non-linear impedances in each of said two arms, and a linear impedance in said third arm.

2. In a signal compression channel having input terminals and output terminals, the combination of a compression network interposed in said channel between said input and said output terminals, said network comprising a shunt branch including at least two arms connected in parallel in series with a third arm, a non-linear impedance in each of said two arms, a fixed linear impedance in at least one of said two arms, a variable linear impedance in the other of said two arms, and a linear impedance in said third arm.

3. In a signal compression channel having input terminals and output terminals, the combination of a compression network interposed in said channel between said input and said output terminals, said network comprising a shunt branch including at least two arms connected in parallel in series with a third arm, thyrite resistor means in each of said two arms, a fixed linear resistor in one of said two arms, a variable linear resistor in the other of said two arms, and a variable linear resistor in said third arm.

4. In a signal compression channel having input terminals and output terminals, the combination of a compression network interposed in said channel between said input and said output terminals, said network comprising a shunt branch including at least two arms connected in parallel in series with a third arm, at least two thyrite resistors and a linear resistor in one of said two arms, at least one thyrite resistor and a variable linear resistor in the other of said arms, and a variable linear resistor in said third arm.

WILLIAM WEST MOE.

REFERENCES CITED

The following references are of record in the file of this patent:

UNITED STATES PATENTS

| Number | Name | Date |
|---|---|---|
| 1,916,187 | Read | June 27, 1933 |
| 2,085,905 | Freidrich | July 6, 1937 |
| 2,098,370 | Bartels | Nov. 9, 1937 |
| 2,171,048 | Rockwell | Aug. 29, 1939 |
| 2,434,155 | Haynes | Jan. 6, 1948 |